2,805,721

INCREASING PERMEABILITY OF SUBTERRANEAN STRATA

George P. Maly, Fullerton, Calif., assignor to Union Oil Company of California, Los Angeles, Calif., a corporation of California No Drawing. Application December 12, 1955, Serial No. 552,298

10 Claims. (Cl. 166—33)

This invention relates to a method for increasing the permeability of subterranean strata, and in particular concerns a method for selectively fracturing low permeability strata which lie closely adjacent to strata of higher permeability.

In certain petroleum producing areas, notably in California, the subterranean oil-bearing formations are far from uniform with respect to permeability. In such regions, it is not uncommon for the permeabilities of closely adjacent strata to differ by as much as 10 fold or more. It is also somewhat characteristic of this type of formation to extend over very considerable intervals; production intervals of 500 or more feet are frequently encountered. As will readily be apparent, when a well is drilled into a formation of this type, the flow of well fluids into the well bore will be primarily from the strata of highest permeability, and it frequently happens that by the time such strata are depleted the reservoir pressure has become reduced to such an extent that it is insufficient to force the well fluids out of the less permeable strata and into the bore hole. Consequently, the fluids contained in the latter strata are never produced, and the formation becomes effectively depleted in a relatively short time even though it may still contain as much as two-thirds of the total fluids originally present.

Formations of the type described above also cause difficulties in secondary recovery operations. When a driving fluid such as water or gas is pumped down an input well which penetrates such type of formation with the object of forcing such fluid outwardly through the formation to drive the oil contained therein towards an output well located at some distance from the input well, the driving fluid will naturally take the path of least resistance, i. e., through the strata of highest permeability. Consequently, the driving fluid passes from the input well to the output well in a few more or less well-defined channels, and the object of sweeping all of the oil from the formation as a whole is not attained.

It is accordingly an object of the present invention to provide a means whereby subterranean formations comprising strata of different permeabilities can be rendered more uniformly permeable.

Another object is to provide a method for increasing the permeabilities of subterranean strata which lie relatively closely adjacent to strata of substantially higher permeabilities.

A further object is to provide a method for selectively increasing the permeabilities of low-permeability strata without increasing the permeabilities of closely adjacent high-permeability strata.

A still further object is to provide a means for increasing the permeabilities of low-permeability strata and in the same general operation decreasing the permeabilities of closely adjacent high-permeability strata.

Other and related objects will be apparent from the following detailed description of the invention, and various advantages not specifically referred to herein will occur to those skilled in the art upon employment of the invention in practice.

I have now found that the foregoing objects and attendant advantages may be realized in a process which comprises forcing into hydraulically fracturable strata of different permeabilities a liquid plugging agent which is capable of setting up within such strata to form a solid plug of relatively high mechanical strength and of relatively low permeability, allowing such liquid to form such solid within the formation, and thereafter applying conventional hydraulic fracturing techniques to the strata which have been so treated. When the well bore opposite the strata to be treated is filled with the liquid plugging agent and pressure is applied thereto, such agent is injected into the strata in accordance with the permeability of each particular stratum. At the end of any given period of time over which the pressure is applied, the distance to which the plugging agent has penetrated into any particular stratum will be directly proportional to the permeability of that stratum with respect to the plugging agent. Accordingly, if the injection pressure is maintained sufficient to force the plugging agent into the strata of highest permeability but insufficient to force it into the strata of lowest permeability, the formation subjected to the treatment will consist of a series of strata, each individual stratum of which contains plugging agent for a distance out from the bore hole which is proportional to the permeability of that stratum. Similarly, after the plugging agent has been allowed to solidify, each individual stratum will contain a solid plug whose length is proportional to the permeability of that stratum. Thus, a stratum whose permeability relative to the plugging agent is, say, 200 units will contain a high-strength low-permeability plug for a distance of, say, 20 inches out from the borehole, whereas a stratum whose relative permeability is, say, 10 units will contain the plug for a distance of only, say, 1 inch out from the bore hole. Since the force required to rupture or fracture the plugs is roughly proportional to their lengths, when pressure is applied to a hydraulic fracturing fluid which has been positioned in the bore the shorter plug will be the first to fracture, and the permeability of the low-permeability stratum will be increased without a corresponding increase in the permeability of the high-permeability stratum. The process of the invention is thus essentially a selective hydraulic fracturing process in which the fracturing is caused to take place in low-permeability strata in preference to high-permeability strata.

I am aware that it has been proposed to coat and/or impregnate unconsolidated formations with resin-forming liquids and the like and, after the liquid has been allowed to solidify, to rupture the solid resin by gun perforation or other explosive means. Such procedure, however, does not selectively increase the permeabilities of low-permeability strata. In contrast, the method of the present invention is particularly directed towards achieving a high degree of selectivity with respect to the ultimate change in the various strata subjected thereto.

Considering now the process of the invention in detail, the first step thereof consists in injecting into the strata traversed by the bore a liquid which is capable of solidifying under the prevailing conditions of temperature and pressure to a relatively high-strength low-permeability solid. As herein employed, the term "liquid" includes pumpable suspensions and slurries as well as true liquids. Such liquid must of course be of such viscosity that it can be forced into the strata by means of more or less conventional pumping equipment. If it consists of a suspension or slurry, the solid particles thereof should be of sufficiently small size that they are carried into the strata along with the suspending medium. Also, the solid which is ultimately formed from the liquid should be inert with respect to the fracturing medium which is subsequently employed. Among the liquid compositions which fulfilled these requirements, those which condense or polymerize to form resinous solids are preferred. The formulation of such resin-forming liquids is well known in the well plugging art; for example, U. S. Patents Nos. 2,476,015; 2,485,521; 2,513,614; and 2,527,581 describe a number of suitable compositions of the phenol-aldehyde type essentially comprising a phenol, an aldehyde and an acidic or basic condensation catalyst. Any of such compositions may be employed in the practice of the present invention. Condensible combinations of urea or thiourea and an aldehyde such as those described in U. S. Patents Nos. 2,307,843 and 2,345,611 are likewise operable, as are the polybasic acid-polyhydric alcohol compositions described in U. S. Patent No. 2,252,271 and the urethane-furfural compositions described in U. S. Patent No. 2,321,761. Suitable polymerizable compositions include those comprising styrene, vinylidine chloride, methyl methacrylate, vinyl esters, and the like as the polymerizable component. Mixtures of polymerizable unsaturated substances may also be employed.

In most instances the transformation of the above-mentioned resin-forming liquids into a solid resin is most conveniently effected through the use of a condensation or polymerization catalyst contained in the liquid composition as an integral component thereof. The nature of the catalyst will of course depend upon the resin-forming components in the composition, but the general type of catalyst most suitable for any particular condensible or polymerizable system is well known. Similarly, the amount of catalyst to be employed in any particular system is within the knowledge and skill of those experienced in the resin plugging art. In general, it is desirable that the catalyst be relatively slow-acting so that ample time can be allowed for positioning the liquid composition within the strata to be treated. In some instances, e. g., when the resin-forming liquid is of the phenol-aldehyde type, the condensation reaction may be carried out in part before the liquid is forced into the strata. Thus, a mixture of phenol, aqueous formaldehyde and sodium hydroxide may be partially condensed to a slightly viscous liquid, and thereafter admixed with an acid catalyst and forced into the strata where condensation to the solid resin stage takes place under the influence of the second catalyst. Partially polymerized material may similarly be employed as the liquid plugging agent, with polymerization to a solid resin being effected within the strata by means of a suitable polymerization catalyst or heat. In some instances the resin-forming reaction may be induced by heat in the absence of a catalyst. Thus, monomeric or partially polymerized styrene may be forced into the strata and therein polymerized to a solid resin under the influence of the elevated temperature which prevails in deep well bores or by the application of heat from external sources, e. g., from an electric heater positioned in the well bore. Partially condensed liquid phenolaldehyde resins may similarly be caused to solidify under the influence of heat alone. The liquid plugging agent may also take the form of a cement slurry which is capable of being forced into highly permeable strata traversed by the well bore, or it may comprise a molten solid, such as molten asphalt, which is kept in the molten state by suitable heating means positioned in the bore. In some instances suspensions of solids and solutions of precipitable materials, e. g., cellulose solutions which can be precipitated or coagulated by suitable means, can likewise be employed. In general, however, these latter materials are less preferred than the aforementioned resin-forming liquids since their use is more or less restricted to highly permeable strata and/or requires the further use of heat or other chemical entities to effect formation of the solid plug.

Any of the conventional techniques may be employed in forcing the liquid plugging agent down the bore hole and out into the strata traversed thereby. Most commonly, this is achieved by introducing the required amount of the plugging agent into the well tubing, and thereafter forcing a driving liquid, such as oil or a non-penetrating liquid mixture, down the tubing on top of the plugging agent until the latter has been forced out into the strata traversed by the bore. As is hereinafter more fully explained, such driving liquid may be the low-penetrating liquid which is employed in the subsequent hydraulic fracturing operations. If desired, the interval selected for treatment may be isolated by packing off the well annulus above and below such interval, but it is preferred to avoid the use of packers if possible. As previously stated, the liquid plugging agent will enter the strata via the path of least resistance, i. e., under the pressure exerted on the driving liquid it will preferentially enter the strata of highest permeability. Accordingly, upon completion of the initial step of the process, the strata of highest permeability will be more or less saturated with the liquid plugging agent for an arbitrary distance out from the bore hole, whereas the strata of lower permeability will be substantially free from such agent. Since the ultimate object of the plugging operation is to increase the fracturing strength of the high-permeability strata to a value above that of the low-permeability strata, the distance into which the plugging agent is injected into the high-permeability strata will depend upon the fracturing strength of the particular plugging agent employed and upon the relative fracturing strength of the strata subjected to the treatment. Such distance can be calculated from such strength values as determined on samples of the solidified plugging agent and on core samples taken from the strata, and the volume of plugging agent required to penetrate such distance into the high-permeability strata can be calculated from the permeability and porosity of such strata and their thickness.

The second step of the process is one of allowing the liquid plugging agent which occupies the high-permeability strata to solidify therein. When such agent is one of the preferred self-condensing or self-polymerizing resin-forming compositions described above, such operation is effected simply by maintaining pressure within the bore until the solid resin is formed under the influence of the ambient temperature of the formation or a catalyst contained in the composition itself. The time required for solidification to take place will of course depend upon the nature of the composition itself and the ambient temperature of the formation. In order to have ample time in which to inject the liquid plugging agent into the formation it is usually desirable to so formulate the composition that at least about 4 hours are required for it to solidify. The solidification time is ordinarily most readily controlled by varying the proportions of the resin-forming components of the composition and/or the concentration of catalyst. When the liquid plugging agent is of the thermosetting type, its solidification is effected by applying heat to the formation in which it has been injected. Similarly, when the liquid plugging agent takes the form of a molten solid, its solidification is effected simply by allowing it to cool within the formation, either naturally or under the influence of a refrigerant introduced into the bore hole, and when the solid plug is one formed by precipitation or coagulation its formation is effected by forcing a suitable precipitant or coagulant into the formation.

The third essential step of the present process consists in applying conventional hydraulically fracturing techniques to the formation as it exists upon completion of the second step. In the usual case, a driving liquid will have been employed to force the liquid plugging agent into the formation and to hold it therein until solidification occurs and a solid plug is formed with the high-permeability strata. When such driving liquid is itself not a fracturing liquid, it must of course be removed before beginning the hydraulic fracturing operation. However, the invention specifically contemplates the employment of a suitable fracturing liquid as the driving liquid in forcing the plugging agent into the formation, and in such case the fracturing operation will immediately follow the aforesaid second step of the process.

The fracturing liquid itself and the operational and manipulative techniques employed in forcing it into the formation and fracturing the same are the same as those previously employed in the hydraulic fracturing art. For the most part fracturing liquids take the form of hydrocarbon gels obtained by dispersing a suitable gelling agent in a relatively light hydrocarbon such as gasoline, kerosene or even light crude. Commonly employed gelling agents include aluminum naphthenate and mixtures thereof with aluminum oleate, hydroxy aluminum soaps of tall oil and fatty acids, aluminum and other metal soaps of various fatty acids derived from coconut oil, peanut oil, etc., organophilic colloids, and the like. The use of such agents to prepare suitable hydrocarbon gels is well understood in the hydraulic fracturing art, and the particular technique involved, i. e., proportions, mixing temperature, etc., depends somewhat upon the particular gelling agent employed. A number of agents specifically formulated for preparing fracturing gels are available commercially, e. g. "Nuodex," and their manner of use is clearly described by the manufacturer. Aqueous fracturing fluids may also be employed in locations where the producing formations are not damaged by water. Gelled acids may also be employed, and in some instances more or less heavy crudes alone may be used. The essential requirements of the fracturing liquid is primarily one of suitable viscosity rather than one of chemical composition, and any inert fluid of satisfactory viscosity may successfully be employed. The viscosity should be between about 30 and about 5000 cps. (Stormer at 600 R. P. M.) and is preferably between about 75 and about 300 cps. The term "low-penetrating liquid" is customarily understood in the hydraulic fracturing art to refer to a liquid having a retarded tendency to filter through permeable media and having a viscosity satisfactory for use in fracturing subterranean earth formations.

Conventionally, the fracturing liquid contains a propping agent in the form of finely-divided solid particles which are carried into the fractures by the liquid and deposited therein to act as props to keep the fractures open after the operation has been completed and the fracturing liquid withdrawn. Such agent conventionally comprises 20–30 mesh sand, and is employed in amounts ranging from 0.05 to 10 lbs./gal. of the fracturing liquid.

The fracturing operation itself is conventionally carried out by introducing the fracturing liquid into the well bore, usually via the well tubing. The fracturing liquid is followed by a charge of crude oil or other suitable driving liquid, which follow-up liquid is continuously pumped down the tubing until the overburden pressure is exceeded and fracturing occurs. Since the initial two steps of the process have resulted in the high permeability strata being plugged with a high-strength low-permeability solid, fracturing will occur in those strata which do not contain such plug, i. e., fracturing will occur in the low-permeability strata. Such fracturing is indicated by a sudden decrease in the pump pressure. Further pumping forces the fracturing liquid farther into the fractured formation and lengthens the fractures. In a typical operation, the pressure required to force the liquid down the well tubing may rise rapidly to, say, 2500 p. s. i. over a period of 5–10 minutes, level off at this value for 30 minutes while the fracturing fluid is being forced into the formation, rise rapidly to, say, 3400 p. s. i. over a period of 2–5 minutes, and then decline more or less rapidly to, say, 2000 p. s. i. and remain at such value while the fracture is being extended. When the fracturing fluid is a self-reverting gel, e. g., "Napalm," which reverts from a gel to a low viscosity sol upon the mere passage of time or upon contact with well fluids, no viscosity-reducing or gel-breaking agent need be introduced into the fractured formation before the fracturing fluid can be withdrawn therefrom and the well placed on production. The gel is simply allowed to remain in the formation under pressure until it liquifies of its own accord or as a result of contacting the well fluids, and upon putting the well back in production it will be displaced from the formation by the flow of well fluids therethrough and be withdrawn from the well along with the well effluent. If the fracturing liquid has contained a propping agent the latter will be deposited and remain behind in the fractures to keep the latter from closing when the pressure is released.

Usually, however, a gel-breaker or viscosity-reducing agent is employed to reduce the viscosity of the fracturing fluid, and in such case the follow-up charge will comprise such agent which is often in turn followed up by a charge of a suitable driving liquid. Such agent may comprise salt brine, aqueous mineral acid, amine solutions, oil-soluble petroleum sulfonates, etc. In some instances a small charge of crude oil or other suitable liquid may be interposed between the fracturing fluid and the viscosity-reducing agent. When the action of the viscosity-reducing agent has become complete and the viscosity of the fracturing liquid is thereby reduced to a value of the same order of magnitude as that of the well fluids, the pressure is released and the well is placed on production, whereupon the fracturing fluid and the viscosity-reducing agent will be withdrawn from the well as part of the well effluent.

The following example will illustrate one way in which the principle of the invention has been applied but is not to be construed as limiting the same.

*Example*

The well selected for treatment in accordance with the process of the invention is 5200′ deep, the last 200′ of which penetrates a producing interval containing several strata having a relative permeability with respect to oil of about 200 md. and a number of strata having a relative permeability of only about 28 md. Prior to carrying out the process it is determined that previous production from the well has been substantially entirely from the high-permeability strata but that the low-permeability strata are substantially saturated with oil. A packer is set in the well annulus at the 5000′ level, and approximately 100 barrels of the following composition is prepared:

| | Parts by weight |
|---|---|
| Cresol | 40 |
| Formalin | 27 |
| Sodium hydroxide | 5 |
| Water | 7 |

This composition is heated at about 200° F. for about 15 minutes, and the liquid resin which is thereby formed is separated from the supernatant water. The liquid resin so prepared is introduced into the well tubing and followed up with a 200-barrel charge of gelled gasoline, which is in turn followed up by a charge of light crude oil, and the latter is pumped down the bore under a pressure of about 1500 p. s. i. until the total amount of liquid introduced into the bore hole exceeds the capacity of the hole by about 100 barrels. Pumping is then discontinued and the pressure is maintained constant for about 48 hours to insure complete solidification of the resin-forming liquid which has been forced into the strata below the packer. Pumping is then continued to force the fracturing liquid into the unplugged low-permeability strata. The pumping pressure rises rapidly to about 2200 p. s. i. and then levels off at this value, to be followed by a very rapid rise to 3500 p. s. i. and a sudden decline to about 2000 p. s. i. Pumping is then discontinued and the well is maintained under pressure for about 24 hours, during which time the gelled hydrocarbon breaks and its viscosity is reduced. The pressure is then released and the well placed on production in the usual manner.

As will be apparent to those skilled in the art, the invention consists essentially in forcing into a formation comprising strata capable of being fractured and having different permeabilities a liquid agent which is capable of solidifying or being solidified within the formation to form therein a low-permeability solid having a resistance to fracturing greater than that of any of said strata and being substantially inert to hydraulic fracturing liquids, the pressure applied to said liquid agent being sufficient to force it into the strata of highest permeability, but insufficient to force it to the same extent into the strata of lowest permeability; allowing such solid to form within the formation so treated; and thereafter forcing into said formation a low-penetrating hydraulic fracturing liquid under sufficient pressure to fracture the strata which contain the least amount of said solid. The exact nature of the liquid plugging agent and the hydraulic fracturing liquid are thus of no particular import to the operability of the invention provided they have the stated essential characteristics. It will further be apparent to those skilled in the art that any of the various known manipulative techniques for forcing fluids into subterranean formations and for hydraulically fracturing such formations may be employed in practicing the process of the invention. It will also be realized that the process may be repeated at any time it becomes necessary or desirable to increase the permeability of low-permeability strata within any particular formation, i. e., the process may be initially carried out as described to increase the permeability of strata whose permeabilities are intermediate between those of other strata traversed by the well bore, and at some subsequent time the process may be repeated within the same well bore to increase the permeability of those strata of lowest permeability. Also, it will be realized that the plugging operation may be carried out stepwise to attain plugging of all but the strata of lowest permeability. For example, the liquid plugging agent may be injected into the formation at such a pressure and rate that it enters only the strata of highest permeability, and is allowed to solidify therein; a further portion of the plugging agent is then injected at such a pressure and rate that it enters only those strata of intermediate permeability, and is allowed to set up therein; finally, the formation is fractured as herein described, fracturing occurring in the unplugged strata of lowest permeability.

While the selective plugging step of the present process has been described as taking place by reason of the liquid plugging agent choosing the path of least resistance through the strata of highest permeability, the selectivity may be enhanced by appropate formulation of the plugging agent. Thus, since an aqueous plugging agent will enter water-saturated strata more readily than oil-saturated strata, if it is determined that the high-permeability strata are water-saturated, plugging selectivity can be improved through the use of an aqueous plugging agent. Aqueous mixtures comprising a phenol, an aldehyde and a water-soluble condensation catalyst are well-adapted for such use. Plugging selectivity may also be improved by suitably adjusting the viscosity of the plugging agent in accordance with the porosity of the strata so that at the selected injection pressure the plugging agent will more readily enter the strata of highest permeability.

Other modes of applying the principle of my invention may be employed instead of those explained, change being made as regards the methods or materials employed, provided the step or steps stated by any of the following claims or the equivalent of such stated step or steps be employed.

I, therefore, particularly point out and distinctly claim as my invention:

1. The process which comprises introducing into a well bore which traverses a plurality of subterranean strata capable of being hydraulically fractured and having different permeabilities a first liquid which is capable of solidifying within said strata to form a solid having a resistance to fracturing greater than that of any of said strata and being substantially inert with respect to the second liquid hereinafter defined; applying to said liquid a pressure sufficient to force it into the strata of highest permeability but insufficient to force it to the same extent into the strata of lowest permeability; causing the liquid which has been so forced into the strata to solidify and form said solid therein; introducing into the well bore a second liquid consisting of a viscous low-penetrating fracturing liquid; applying to said fracturing liquid a pressure sufficient to fracture those strata which contain the least amount of said solid; and withdrawing said fracturing liquid from the fractures so formed.

2. The process of claim 1 wherein the said first liquid is a liquid resin-forming composition, the components of which condense under the conditions prevailing in said strata to form an oil-insoluble resin.

3. The process of claim 1 wherein the said first liquid is a condensible mixture comprising a phenol, an aldehyde and a condensation catalyst for said phenol and aldehyde.

4. The process of claim 1 wherein the said first liquid comprises a polymerizable unsaturated organic compound and a polymerization catalyst therefor.

5. The process of claim 1 wherein the said fracturing liquid is a gelled hydrocarbon.

6. The process which comprises introducing into a well bore which traverses a plurality of subterranean fluid-containing strata capable of being hydraulically fractured and having different permeabilities a first liquid which is capable of solidifying within said strata to form a solid having a resistance to fracturing greater than that of any of said strata and being substantially enert to the second liquid hereinafter defined; introducing into said well bore a second liquid consisting of a viscous low-penetrating fracturing liquid; moving said second liquid down the well bore under a pressure sufficient to force said first liquid into the strata of highest permeability but insufficient to force said first liquid to the same extent into the strata of lowest permeability until said first liquid has been forced into strata traversed by the bore; holding said first liquid within the strata into which it has been forced while causing it to solidify and form said solid therein; applying to said second liquid a pressure sufficient to fracture those strata which contain the least amount of said solid; and withdrawing the said second liquid from the fractures so formed.

7. The process of claim 6 wherein the said second liquid is a gelled hydrocarbon.

8. The process which comprises introducing into a well bore which traverses a plurality of subterranean fluid-containing strata capable of being hydraulically fractured and having different permeabilities a first liquid which is capable of solidifying within said strata to form a solid having a resistance to fracturing greater than that of any of said strata and being substantially inert with respect to the second liquid hereinafter defined; applying to said liquid a pressure sufficient to force it into the strata of highest permeability but insufficient to force it to the same extent into the strata of lowest permeability; causing the liquid which has been so forced into the strata to solidify and form said solid therein; introducing into the well bore a second liquid consisting of a viscous low-penetrating fracturing liquid; applying to said fracturing liquid a pressure sufficient to fracture those strata which contain the least amount of said solid; contacting said fracturing liquid with a viscosity-reducing agent; and withdrawing the fracturing liquid of reduced viscosity from the well.

9. The process which comprises introducing into a well bore which traverses a plurality of subterranean fluid-containing strata capable of being hydraulically fractured and having different permeabilities a liquid which is capable of solidifying within said strata to form a substantially water-insoluble oil-insoluble resin having a resistance to fracturing greater than that of any of said strata; applying to said liquid a pressure sufficient to force it into the strata of highest permeability but insufficient to force it to the same extent into the strata of lowest permeability; causing the liquid which has been so forced into the strata to solidify and form said solid resin therein; introducing into the well bore a viscous gelled hydrocarbon fracturing liquid; applying to said fracturing liquid sufficient pressure to fracture those strata which contain the least amount of said solid; and withdrawing said fracturing liquid from the fractures so formed.

10. The process of claim 9 wherein, after fracturing has taken place, the fracturing liquid is contacted with a gel-breaking liquid to reduce its viscosity.

References Cited in the file of this patent

UNITED STATES PATENTS

| | | |
|---|---|---|
| 2,248,028 | Prutton | July 1, 1941 |
| 2,513,614 | Barkhuff | July 4, 1950 |
| 2,596,843 | Farris | May 13, 1952 |

OTHER REFERENCES

Hassebroek: World Oil Production Sec., February 1, 1951, page 134.